(12) United States Patent
Calton et al.

(10) Patent No.: US 8,491,889 B1
(45) Date of Patent: Jul. 23, 2013

(54) METHOD FOR REDUCING MICRONUTRIENT COMPETITIONS

(76) Inventors: Jayson B. Calton, North Venice, FL (US); Mira L. Calton, North Venice, FL (US)

( * ) Notice: Subject to any disclaimer, the term of this patent is extended or adjusted under 35 U.S.C. 154(b) by 636 days.

(21) Appl. No.: 12/693,508

(22) Filed: Jan. 26, 2010

(51) Int. Cl.
*A61K 38/43* (2006.01)

(52) U.S. Cl.
USPC .......................................... 424/94.1

(58) Field of Classification Search
None
See application file for complete search history.

(56) References Cited

U.S. PATENT DOCUMENTS 5,976,568 A * 11/1999 Riley ............................ 424/451
2005/0112211 A1* 5/2005 Gervais et al. ................ 424/646

* cited by examiner

*Primary Examiner* — Ralph Gitomer
*Assistant Examiner* — Teresa E Knight
(74) *Attorney, Agent, or Firm* — Malin Haley DiMaggio & Bowen, P.A.

(57) ABSTRACT

Methods are described for increasing the absorption of micronutrients such as vitamins and minerals by an organism's digestive system. Multiple competitions and multiple synergies between micronutrients are identified and micronutrient formulations are created so that synergistic micronutrients are included in the same formulation while competitive or interfering micronutrients are included in different formulations. At least two micronutrient formulations can be created with each formulation being ingested by the organism at a different time within a single twenty-four hour period or longer. By ingesting each micronutrient formulation at different and remote times, advantage is obtained from absorption synergies existing between some micronutrients while absorption interferences between competitive micronutrients are avoided or eliminated so as to increase the efficiency of absorption of micronutrients by the digestive system. In another embodiment, the micronutrient formulations can be introduced through skin pores or directly into blood capillaries (arteries or veins) through some kind of delivery system including but not limited to a skin patch or a surgically implanted device.

3 Claims, 1 Drawing Sheet

| Formula | 1 | 2 | 3 |
|---|---|---|---|
| Vitamin A | c | 2500 IU | c |
| Alpha and Beta Carotene | c | 2500 IU | c |
| Lutein | c | c | 10 MG |
| Lycopene | 4 MG | c | c |
| Zeaxanthin | c | c | 2 MG |
| Astaxanthin | c | c | 1 MG |
| Vitamin C | 266 MG | 266 MG | 266 MG |
| Vitamin D | 500 IU | c | 500 IU |
| Vitamin E | 400 IU | c | c |
| Vitamin K | c | c | 80 MCG |
| Vitamin B-1 | 8.3 MG | 8.3 MG | 8.3 MG |
| Vitamin B-2 | 8.3 MG | 8.3 MG | 8.3 MG |
| Vitamin B-3 | 10 MG | 10 MG | 10 MG |
| Vitamin B-5 | 25 MG | 275 MG | c |
| Vitamin B-6 | 2 MG | 2 MG | 2 MG |
| Vitamin B-7 | 25 MCG | c | 275 MCG |
| Vitamin B-9 | 400 MG | c | 400 MG |
| Vitamin B-12 | 350 MCG | 350 MCG | 100 MCG |
| Calcium | 600 MG | c | 600 MG |
| Magnesium | c | 400 MG | c |
| Zinc | c | 15 MG | c |
| Copper | c | c | 2 MG |
| Selenium | 100 MCG | c | 100 MCG |
| Manganese | 1 MG | c | 1 MG |
| Iodine | 50 MCG | 50 MCG | 50 MCG |
| Molybdenum | 37.5 MCG | 37.5 MCG | c |
| Chromium | c | 200 MCG | c |
| Boron | 1 MG | 1 MG | 1 MG |
| Silicon | 2 MG | c | 2 MG |
| Vanadium | 5 MCG | c | 5 MCG |
| CoQ10 | 66 MG | 66 MG | 66 MG |
| Alpha Lipoic Acid | 66 MG | 66 MG | 66 MG |
| Carnitine | 500 MG | 500 MG | 500 MG |
| Phosphatidyl Choline | 33 MG | 33 MG | 33 MG |
| Inositol | 33 MG | 33 MG | 33 MG |
| Quercetin | 250 MG | 250 MG | 250 MG |
| Grapeseed Extract | 33 MG | 33 MG | 33 MG |
| Iron | c | c | c |

METHOD FOR REDUCING MICRONUTRIENT COMPETITIONS

FIELD OF THE INVENTION

The invention relates to compositions and methods for improving micronutrient absorption, and/or utilization during digestion or introduction directly into the blood stream using other methods of nutrient delivery. More particularly, the invention relates to compositions and methods for reducing four types of competitions between micronutrients such as vitamins and minerals to increase micronutrient absorption and efficacy by separating and/or scheduling the intake of competing micronutrients into different formulas and/or at different times.

BACKGROUND

The over-the-counter and prescription vitamin and supplement industry produces and sells many nutritive supplements to consumers. Such products are not limited to those for human consumption but also extend to "multi-vitamin" products for ingestion by and the nutritional benefit of pets, livestock, poultry and other animals. Conventional so-called "multi-vitamins" often are not composed of vitamins only but include a combination of numerous vitamins, minerals, and other compounds having beneficial nutritional health effects. These minerals and other compounds are essential for good health, and dietary deficiencies of them may result in illness or death. In addition to dietary (or primary) deficiencies that occur when a human or other animal fails to obtain a sufficient amount of a nutrient through a normal healthy diet, the organism may also develop secondary nutrient deficiencies caused by disease, illness, or other factors impacting health and nutrition such as, for example, gastric bypass surgery, excessive consumption of nutrient poor foods, alcohol or smoking. To correct such nutrient deficiencies and to ensure the general intake of normal amounts of nutrients, health experts and physicians often recommend the administration of a "multi-vitamin" dietary supplement.

The micronutrients used to create each micronutrient formulation (s) can be and are herein defined as all vitamins, minerals, enzymes and coenzymes (i.e. CoQ10), essential fatty acids (EFA's) and their derivatives (i.e., EPA, DHA), nutraceutical compounds, phytochemicals, polyphenols (i.e., quercetin), amino acids (i.e., L-Carnitine), antioxidants, organosulfur compounds (i.e., alpha lipoic acid), and other natural components of food or food like substances (i.e., grape seeds).

Vitamins, minerals, and other nutritive compounds are absorbed at various absorption sites within a human or other animal's digestive tract, including the rectum, as well as through skin pores or directly into blood capillaries. Many vitamins and minerals are absorbed at sites located within the small intestine. The numbers of these sites for the absorption or uptake of each nutrient are, of course, limited.

There are four types of competition that can occur between micronutrients and which pertain to this invention.

Chemical competitions take place prior to consumption of micronutrients, during the time between manufacturing and ingestion or utilization of a nutritive formula or multi-vitamin. This occurs because the manufacturers combine competing nutrients into one nutritive formula or multi-vitamin, in combining the competing nutrients in the nutritive formula or multi-vitamin a chemical battle ensues within the nutritive formula or multi-vitamin itself, leaving the competing micronutrients unable to be absorbed and/or utilized.

Biochemical competitions happen after the person's body has ingested the micronutrients in the multi-vitamin, but before the micronutrients have been absorbed. This occurs when micronutrients compete for a common receptor site for absorption or transport pathways.

Physiological competitions occur after the vitamins have been absorbed and/or when micronutrients have been introduced directly into the bloodstream. This is when two competing micronutrients may cause decreased utilization of one or both, even after absorption has taken place.

Clinical competitions occur when the presence of one micronutrient masks the deficiency of another, making it very difficult to detect deficiency.

Research has proven that many nutrients "compete" with one another both by chemical competitions which occur within a micronutrient formula and by biochemical competitions at the absorption sites and/or transport pathways within an animal's digestive tract. Competing nutrients interfere with one another's absorption and/or utilization by the body. When a dietary supplement containing numerous nutrients are administered in a single dose, several of the supplement's nutrients interfere with each other's digestive absorption and/or its utilization potential either by chemically negating one or both of the competing nutrients before ingestion or introduction to the blood stream by any method, or by bio-chemically competing for absorption sites after ingestion, or by physiological competitions occurring within the blood stream. Thus, many of the nutrients in "multi-vitamin" dietary supplements are not absorbed during digestion because of the competing effects of their constituent parts and are excreted by the body thereby producing little or no beneficial health effects. In addition, many of the competitive nutrients in a nutritive formula delivered directly into the blood stream produce little or no beneficial health effects due to decreased utilization.

There is a flip side to competition and interference. Think of all the difficulties that micronutrient competition causes. Turn these competitions upside down, and a world of positive benefits appear. For every type of benefit negating competition, there can be an equal and opposite benefit enhancing synergy to which it relates.

The opposite of a chemical competition is a chemical synergy. Both take place in the multi-vitamin itself prior to ingesting. A chemical synergy would mean that when two micronutrients are put into the same multi-vitamin, they form an advantageous complex that can help to increase the absorption of either nutrient, or possibly both. Zinc and vitamin B2 (riboflavin) share such a relationship.

The opposite of a biochemical competition is a biochemical synergy. In this case, rather than fight for a receptor site or pathway, one micronutrient aids in the absorption of the second. An example of this is when vitamin D aids in the absorption of calcium.

The opposite of a physiological competition is a physiological synergy. Unlike its opposite competitive counterpart where two nutrients decreased each other's utilization, in physiological synergy, one nutrient will aid in the performance of a second nutrient. This takes place because the one nutrient needs to perform a specific function, in order for a second nutrient to do its job. For example, vitamin K needs to be available in the body when calcium arrives. It is essential in the formation of bone tissue.

The opposite of clinical competition is clinical synergy. Clinical synergy takes place when micronutrients have been found to work together to create an observable yet unexpected beneficial change in the body. These clinical synergies have been attributed to decreasing the chances of a disease. An example of this occurs when folic acid (B9), vitamin B12 and B6 are present together in adequate amounts and convert homocysteine into cysteine and methionine. This conversion lowers homocysteine which is known marker of coronary disease.

A need exists for methods and systems in which nutritional dietary supplements can be administered in a manner that maximizes the body's digestive absorption, utilization and beneficial use of micronutrients. A need also exists for dietary supplement systems and methods that allow a human or other animal's diet to be supplemented with various micronutrients administered at intervals of time so as to reduce competitive interference by some micronutrients with the body's digestive absorption of others and to increase synergy.

SUMMARY

The invention relates to methods for increasing the absorption and/or utilization of micronutrients such as vitamins and minerals by a human or other organism via its digestive system or direct introduction of micronutrients into the blood stream through blood capillaries, skin patches or areas such as the rectum. Competitions and synergies between micronutrients are identified and micronutrient formulations are created so that synergistic micronutrients are included in the same formulation while competitive or interfering micronutrients are included in different formulations. At least two micronutrient formulations can be created with each formulation being ingested by or delivered to the organism at a different time period within a single twenty-four hour period or longer. By ingesting or introducing each micronutrient formulation at different and remote times, advantage is obtained from absorption synergies existing between some micronutrients while absorption interferences between competitive micronutrients are avoided or eliminated so as to increase the efficiency of absorption of micronutrients by the digestive system.

The invention also relates to compositions of micronutrient formulations intended to be ingested in two or more (or longer) doses by a human or other organism. Each micronutrient formulation can be formulated to contain micronutrients that exhibit synergistic effects when ingested together as a single dose. Each micronutrient formulation can also be formulated so as to exclude any micronutrient that would compete with and interfere with the digestive absorption of other micronutrients in the formulation, for example, by overwhelming absorption sites in the small intestine. The micronutrients used to create each micronutrient formulation can be vitamins, minerals, enzymes and coenzymes, nutraceutical compounds, phytochemicals, and combinations or mixtures of the same.

An advantage is derived for the health and nutrition of a human or other animal ingesting daily the micronutrient formulations or micronutrient-containing dietary supplements of the methods and systems of this invention because each formulation includes micronutrients that act synergistically when being absorbed during digestion but excludes competing micronutrients that interfere with one another's absorption during digestion. Competing micronutrients excluded from one (e.g., a first) micronutrient formulation can be included in a different (e.g., second or third) micronutrient formulation that can be ingested at a later time so as to avoid the competing interactions that would otherwise occur if all of the micronutrients were ingested in a single dose.

Accordingly, the invention features a system for improving nutrition. The system can include a first dietary supplement to be administered at a first time and a second dietary supplement to be administered at a second time. The first and second dietary supplements may be formulated to pair micronutrients that act synergistically when ingested in a single dose and to exclude at least one micronutrient of any set of micronutrients that interferes with another micronutrient's absorption when ingested in a single dose.

In another aspect, the system of the invention can feature a third dietary supplement to be administered at a third time. The third dietary supplement may be formulated to pair micronutrients that act synergistically when ingested in a single dose and to exclude at least one micronutrient of any set of micronutrients that interferes with another micronutrient's absorption when ingested in a single dose.

In another aspect, the system of the invention can feature the first, second, and third times occurring at regular intervals during a period of about 12 to about 24 hours, or a longer period.

A method of the invention can be used to increase the absorption of micronutrients ingested by an organism. The method can include the step of identifying micronutrient competitions for absorption sites in a digestive system of an organism. The method can also include the step of creating at least a first micronutrient formulation and a second micronutrient formulation. Each micronutrient formulation can feature at least one competing micronutrient that interferes with absorption of at least one competing micronutrient of the other micronutrient formulation. The method can further include the step of scheduling consumption of the first micronutrient formulation at a first time and consumption of the second micronutrient formulation at a second time that is different than the first time to avoid the interference of the competing micronutrients during digestion.

Another method of the invention can feature the step of including in the first micronutrient formulation at least two micronutrients selected from among the following group of micronutrients: vitamin A, alpha carotene, beta carotene, lutein, lycopene, zeaxanthin, astaxanthin, vitamin C, vitamin D, vitamin E, vitamin K, vitamin B1, vitamin B2, vitamin B3, vitamin B5, vitamin B6, vitamin B7, vitamin B9, vitamin B12, calcium, magnesium, zinc, copper, selenium, manganese, iodine, molybdenum, chromium, boron, silicon, vanadium, coenzyme Q10, alpha lipoic acid, carnitine, phosphatidyl choline, inositol, quercetin, grapeseed extract, and iron.

Another method of the invention can feature the step of including in the second micronutrient formulation at least two micronutrients selected from among the following group of micronutrients: vitamin A, alpha carotene, beta carotene, lutein, lycopene, zeaxanthin, astaxanthin, vitamin C, vitamin D, vitamin E, vitamin K, vitamin B1, vitamin B2, vitamin B3, vitamin B5, vitamin B6, vitamin B7, vitamin B9, vitamin B12, calcium, magnesium, zinc, copper, selenium, manganese, iodine, molybdenum, chromium, boron, silicon, vanadium, coenzyme Q10, alpha lipoic acid, carnitine, phosphatidyl choline, inositol, quercetin, grapeseed extract, and iron.

Another method of the invention can feature the first time and the second time occurring during a single 24-hour period.

Another method of the invention can feature the first time and the second time occurring during a single 12-hour period.

Another method of the invention can include the step of reducing competition among the micronutrients of the first and second micronutrient formulations for absorption sites during digestion by having the organism ingest each of the formulations once daily or longer time period.

Another method of the invention can include the step of ingesting a third micronutrient formulation at a third time that is different from the first and second times.

Another method of the invention can feature the first micronutrient formulation including lycopene, vitamin C, vitamin D, vitamin E, vitamin B1, vitamin B2, vitamin B3, vitamin B5, vitamin B6, vitamin B7, vitamin B9, vitamin B12, calcium, selenium, manganese, iodine, molybdenum, boron, silicon, vanadium, coenzyme Q10, alpha lipoic acid, carnitine, phosphatidyl choline, inositol, quercetin, and grapeseed extract.

Another method of the invention can feature the second micronutrient formulation including vitamin A, alpha carotene, beta carotene, vitamin C, vitamin B1, vitamin B2, vitamin B3, vitamin B5, vitamin B6, vitamin B12, magnesium, zinc, iodine, molybdenum, chromium, boron, coenzyme Q10, alpha lipoic acid, carnitine, phosphatidyl choline, inositol, quercetin, and grapeseed extract.

Another method of the invention can feature the third micronutrient formulation including lutein, zeaxanthin, astaxanthin, vitamin C, vitamin D, vitamin K, vitamin B1, vitamin B2, vitamin B3, vitamin B6, vitamin B7, vitamin B9, vitamin B12, calcium, copper, selenium, manganese, iodine, boron, silicon, vanadium, coenzyme Q10, alpha lipoic acid, carnitine, phosphatidyl choline, inositol, quercetin, and grapeseed extract.

Another method of the invention can include the first, second and third micronutrient formulations being each administered as separate, single doses at different predetermined time intervals.

Another method of the invention can include each micronutrient formulation being created and administered as a pill (including electronic smart pills or the like), tablet, capsule, liquid, powder, paste, dermal (skin) patch, suppository, or food additive.

Another method of the invention can include the digestive system being a human digestive system.

Another method of the invention can include the digestive system being a digestive system of a mammal other than a human.

Another method of the invention can include the digestive system being the digestive system of a bird.

Another method of the invention can include the step of excluding one of the competing micronutrients from the first micronutrient formulation and including the competing micronutrient in the second micronutrient formulation where two micronutrients exhibit competitive interactions during digestive absorption when ingested simultaneously.

Another method of the invention can include the step of including micronutrients exhibiting synergistic effects during digestive absorption when ingested simultaneously in the same micronutrient formulation.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

FIG. 1 is a chart detailing one embodiment of the system of micronutrients that can be administered three times daily to a human showing examples of competitions.

DETAILED DESCRIPTION

The invention provides methods and systems for improving nutrition. The methods of the invention can be used to increase the absorption of micronutrients ingested by an organism by administering micronutrients in the form of dietary supplements ingested in two or more doses taken daily.

In one step of the method, micronutrient competitions for absorption sites in a digestive system of an organism can be identified. The organism can be a human, a mammal other than a human, or a bird. Other types of animals such as, for example, reptiles may also be administered micronutrients using a method of this invention. Hereafter, for exemplary purposes only and not by way of limitation, the organism referred to is a human (also referred to herein as person or individual).

Once micronutrient competitions have been identified, micronutrient formulations, which can be administered to the individual, can be created from selections of micronutrients that when mixed avoid competitive interactions that would otherwise interfere with the body's digestive absorption of some of the micronutrients at absorption sites within the person's digestive tract. To avoid such competitive interactions between micronutrients, multiple micronutrient formulations can be created. In an exemplary embodiment, at least a first micronutrient formulation and a second micronutrient formulation can be created. Each micronutrient formulation can feature at least one competing micronutrient that would interfere with absorption of at least one competing micronutrient of the other micronutrient formulation but for their separation and inclusion in different micronutrient formulations.

Using the method, where two micronutrients exhibit competitive interactions during digestive absorption when ingested simultaneously, one of the competing micronutrients can be excluded from the first micronutrient formulation and included in the second or third micronutrient formulations. Similarly, one of a pair of competing micronutrients can be excluded from the second micronutrient formulation and included in the first or third micronutrient formulations, or in another example, a competing micronutrient can be excluded from the third micronutrient formulation and included in the first or second micronutrient formulations.

In a more exemplary embodiment, the method can include the step of creating the first and second micronutrient formulations and a third micronutrient formulation. Other greater numbers of micronutrient formulations (e.g., four, five, six or more) are also contemplated by the inventor. Each of the three micronutrient formulations can be ingested as separate, single doses once daily by the individual at regular intervals. The first micronutrient formulation can be ingested by the person at a first time. The second micronutrient formulation can be ingested by the person at a second time that is different from the first time. The third micronutrient formulation can be ingested at a third time that is different from both the first and second times. For example, a different one of the micronutrient formulations could be ingested before, during, or after each meal. The person can ingest the first micronutrient formulation at breakfast, the second micronutrient formulation at lunch, and the third micronutrient formulation at dinner. In one embodiment, all of the micronutrient formulations can be administered once daily during a single 24-hour period or longer. In another embodiment, all of the micronutrient formulations can be administered once daily at regular intervals during a single 12-hour period. The interval of time between ingestion of each micronutrient formulation can be about 3, 4, 5, 6, 7, or 8 hours.

By staggering ingestion of each micronutrient formulation at an interval that is remote from the individual's ingestion of the last-administered micronutrient formulation, the previously ingested formulation is allowed sufficient time to be absorbed in the digestive tract before the next formulation is consumed. This scheduling of the administration of the micronutrient formulations assists in avoiding simultaneous presence of competing micronutrients at absorption sites within the digestive tract, thereby also reducing or eliminating competitive interactions between the competing micronutrients.

In one embodiment, the first micronutrient formulation can include at least two micronutrients selected from among the following group of micronutrients: vitamin A, alpha carotene, beta carotene, lutein, lycopene, zeaxanthin, astaxanthin, vitamin C, vitamin D, vitamin E, vitamin K, vitamin B1, vitamin B2, vitamin B3, vitamin B5, vitamin B6, vitamin B7, vitamin B9, vitamin B12, calcium, magnesium, zinc, copper, selenium, manganese, iodine, molybdenum, chromium, boron, silicon, vanadium, coenzyme Q10, alpha lipoic acid, carnitine, phosphatidyl choline, inositol, quercetin, grapeseed extract, and iron. The second and third micronutrient formulations may also each include at least two micronutrients selected from among the foregoing.

In an exemplary embodiment detailed in FIG. 1, the method can feature the first micronutrient formulation including lycopene, vitamin C, vitamin D, vitamin E, vitamin B1, vitamin B2, vitamin B3, vitamin B5, vitamin B6, vitamin B7, vitamin B9, vitamin B12, calcium, selenium, manganese, iodine, molybdenum, boron, silicon, vanadium, coenzyme Q10, alpha lipoic acid, carnitine, phosphatidyl choline, inositol, quercetin, and grapeseed extract. In this exemplary embodiment, the second micronutrient formulation can include vitamin A, alpha carotene, beta carotene, vitamin C, vitamin B1, vitamin B2, vitamin B3, vitamin B5, vitamin B6, vitamin B12, magnesium, zinc, iodine, molybdenum, chromium, boron, coenzyme Q10, alpha lipoic acid, carnitine, phosphatidyl choline, inositol, quercetin, and grapeseed extract. In the same exemplary embodiment, the third micronutrient formulation can include lutein, zeaxanthin, astaxanthin, vitamin C, vitamin D, vitamin K, vitamin B1, vitamin B2, vitamin B3, vitamin B6, vitamin B7, vitamin B9, vitamin B12, calcium, copper, selenium, manganese, iodine, boron, silicon, vanadium, coenzyme Q10, alpha lipoic acid, carnitine, phosphatidyl choline, inositol, quercetin, and grapeseed extract. FIG. 1 shows three different formulations and competitions between the ingredients listed. FIG. 1 shows competitions by the letter "C" in the respective boxes.

One or more of the micronutrient formulations may also feature iron, although iron has been determined to exhibit competitive interactions that interfere with the absorption of many micronutrients including but not limited to vitamin B12, calcium, manganese, magnesium, zinc, chromium, and copper.

Example I

Example I, describes the competitive interactions between the formulas 1, 2 and 3 shown in FIG. 1.

| Nutrient 1 | INTERACTS WITH Nutrient(s) | # of Interactions | Formula |
|---|---|---|---|
| 1. Vitamin A | Vitamin D, E | (2) | 1 |
| 2. Vitamin A | Vitamin D, K | (2) | 3 |
| 3. Beta Carotene | Lycopene | (2) | 1 |
| 4. Beta Carotene | Lutein, Zeaxanthin | (1) | 3 |
| 5. Lutein | Lycopene | (1) | 1 |
| 6. Lutein | Beta Carotene | (1) | 2 |

-continued

| Nutrient 1 | INTERACTS WITH Nutrient(s) | # of Interactions | Formula |
|---|---|---|---|
| 7. Lycopene | Beta Carotene | (1) | 2 |
| 8. Lycopene | Lutein | (1) | 3 |
| 8a. Zeaxanthin | Lycopene | (1) | 1 |
| 9. Zeaxanthin | Beta Carotene | (1) | 2 |
| 9a. Astaxanthin | Lycopene | (1) | 1 |
| 9b. Astaxanthin | Beta Carotene | (1) | 2 |
| 10. Vitamin D | Vitamin A | (1) | 2 |
| 11. Vitamin E | Vitamin A | (1) | 2 |
| 12. Vitamin E | Vitamin K | (1) | 3 |
| 13. Vitamin K | Vitamin E | (1) | 1 |
| 14. Vitamin K | Vitamin A | (1) | 2 |
| 15. B5 | B7, copper | (2) | 3 |
| 16. B7 | B5 | (1) | 2 |
| 17. B9 | Zinc | (1) | 2 |
| 18. Calcium | Zinc, magnesium | (2) | 2 |
| 19. Magnesium | Manganese, calcium | (2) | 1 |
| 20. Magnesium | Manganese, Calcium | (2) | 3 |
| 21. Zinc | Copper, Calcium, B9 | (3) | 2 |
| 22. Zinc | B9, Calcium | (2) | 1 |
| 23. Copper | Molybdenum, B5, | (2) | 1 |
| 24. Copper | Molybdenum, B5, Zinc | (3) | 2 |
| 24a. Selenium | Chromium, zinc, Magnesium | (3) | 2 |
| 25. Manganese | Magnesium | (1) | 2 |
| 26. Molybdenum | Copper | (1) | 3 |
| 26a. Chromium | Vanadium | (1) | 1 |
| 26b. Chromium | Selenium | (1) | 3 |
| 26c. Silicon | Magnesium | (1) | 2 |
| 26d. Vanadium | Chromium | (1) | 2 |
| 27. Iron | Vitamin B12, Calcium, manganese | (3) | 1 |
| 28. Iron | Vitamin B12, Magnesium, Zinc, Chromium | (4) | 2 |
| 29. Iron | Vitamin B12, Calcium, Copper, Manganese | (4) | 3 |
| | TOTALS | (60) | |

For example: if vitamin A was in formula 1 it would compete with vitamin D and K. This would be 2 interactions as indicated. Also, Lutein would compete with beta-carotene if it was present in formula 2, this would be 1 interaction. Lastly, zinc would compete with calcium in formula 3 if it were present, this would be one interaction. There are approximately 60 potential competitive interactions within the 3 formulas as indicated in Example I.

Based on these potential interactions, the method of the invention separates what would be a one time a day multi-vitamin into a three times a day multi-vitamin with completely different formulations taken at three different times during the day providing a constant supply of water-soluble nutrients to the consumer while eliminating numerous competitions that would have potentially robbed them of the micronutrient benefit they expected from the multi-vitamin. It is important to note that unless water-soluble vitamins and minerals are delivered every 12 hours to the body such as vitamin C or calcium, the body is left without these vital nutrients because the body excretes them within 12 hours after they are ingested.

It may also be important to note that the invention also pairs up extremely beneficial synergistic micronutrients within its 3 formulas. An example of this is bioflavonoids (like quercetin) and vitamin C. This pairing has been shown to increase vitamin C absorption by as much as 50%. Another example is vitamin A and zinc in formula 2 and vitamin D and calcium in formulas 1 and 3 are other examples of positive synergistic pairing purposefully arranged for added benefit to the consumer there are approximately 54 such synergistic pairings within the 3 daily formulas.

While each formula is different, one formula does not have a special function over another. They all work together over the period of a day or other time period to ensure optimal health. No one formula would be complete or should be taken without the others. Doing so would result in incomplete micronutrient supplementation and would likely cause a deficiency in one or many other essential nutrients.

The competitions of micronutrients shown in FIG. 1 are further examined in Example I including the interacting nutrients and the daily formula numbers 1, 2 or 3.

The method may feature each micronutrient formulation being created and administered as a pill (including electronic smart pills or the like), tablet, capsule, liquid, powder, paste, dermal (skin) patch, suppository, or food additive. The capsule can be a time-release capsule if desired. In another embodiment, the micronutrient formulations can be created in a liquid form that is injectable by use of a syringe. In another embodiment, the micronutrient formulations can be introduced through skin pores or directly into blood capillaries (arteries or veins) through some kind of delivery system including but not limited to a skin patch or a surgically implanted device. Each micronutrient formulation may be created in a different form for administration to the person. For example, the first micronutrient can be a pill capable of being ingested, the second micronutrient formulation can be a liquid, and the third micronutrient formulation can be a powder that can be mixed with food items, for example with a salad dressing, as a food additive.

In another embodiment of the invention, the method can include the step of including micronutrients exhibiting synergistic effects during digestive absorption when ingested simultaneously in the same micronutrient formulation. By pairing synergistic micronutrients in the same micronutrient formulation, the amount of each synergistic micronutrient absorbed is increased thereby enhancing the beneficial nutritional and health effects of the formulation.

The invention also relates to systems for improving nutrition. In one embodiment, the system can include a first dietary supplement that is a micronutrient formulation to be administered at a first time and a second dietary supplement to be administered at a second time. The first and second dietary supplements may be formulated to pair micronutrients that act synergistically when ingested in a single dose and to exclude at least one micronutrient of any set of micronutrients that interferes with another micronutrient's absorption when ingested in a single dose.

As mentioned with respect to the methods above, the system can also feature a third dietary supplement to be administered at a third time. Like the first and second dietary supplements, the third dietary supplement may also be formulated to pair micronutrients that act synergistically when ingested in a single dose and to exclude at least one micronutrient of any set of micronutrients that interferes with another micronutrient's absorption when ingested in a single dose.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for increasing and enhancing absorption of multiple micronutrients introduced into or ingested by a subject comprising:
    selecting a plurality of micronutrients that provide a substantially complete micronutrient regimen on a periodic basis for a particular subject;
    identifying absorption competition among two or more micronutrients within the multiple micronutrient regimen;
    identifying absorption synergies among two or more micronutrients within the multiple micronutrient regimen;
    selectively separating the absorption competition micronutrients;
    selectively pairing the absorption synergy micronutrients;
    creating at least a first micronutrient formulation and at least a second micronutrient formulation
    wherein:
    (a) vitamins B6, B9 (folic acid) are administered in the first micronutrient formulation and B6 and B12 are administered in the second micronutrient formulation once daily;
    (b) vitamins A, D, and K are administered daily, and vitamin A is not administered with vitamin D;
    (c) vitamin C and quercetin are co-administered, at least every twelve hours;
    (d) vitamin A and zinc are administered together;
    (e) vitamin D and calcium are administered together; and
    (f) if administered at all, iron is administered separately from the first and second micronutrient formulation.

2. The method as in claim 1 wherein:
    (g) Selenium and vitamin E are co-administered in the morning and vitamin A, Zinc and B2 are co-administered in the evening.

3. The method of claim 1 wherein the first micronutrient formulation is administered in the morning and the second micronutrient formulation is administered in the evening.

* * * * *